United States Patent
Schat (10) Patent No.: US 10,629,011 B2
(45) Date of Patent: Apr. 21, 2020

(54) WIRELESS RECEIVER AND METHOD FOR DETECTING AN ATTACK ON A KEYLESS ENTRY SYSTEM FOR A VEHICLE

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/051,558

(22) Filed: Aug. 1, 2018

(65) Prior Publication Data

US 2020/0043265 A1 Feb. 6, 2020

(51) Int. Cl.
- *G07C 9/00* (2020.01)
- *H04L 29/06* (2006.01)
- *B60R 25/24* (2013.01)
- *H04W 52/24* (2009.01)

(52) U.S. Cl.
CPC .......... *G07C 9/00309* (2013.01); *B60R 25/24* (2013.01); *H04L 63/1416* (2013.01); *H04L 63/1466* (2013.01); *H04W 52/245* (2013.01); *G07C 2009/00555* (2013.01)

(58) Field of Classification Search
CPC ................................................ G07C 9/00309
See application file for complete search history.

(56) References Cited

U.S. PATENT DOCUMENTS

| | | | | |
|---|---|---|---|---|
| 9,775,034 | B2* | 9/2017 | Hekstra | H04K 1/02 |
| 2007/0116104 | A1* | 5/2007 | Fujiwara | H04B 1/7183 |
| | | | | 375/149 |
| 2014/0330449 | A1* | 11/2014 | Oman | B60R 25/01 |
| | | | | 701/2 |
| 2018/0186332 | A1* | 7/2018 | Bocca | B60R 25/24 |

FOREIGN PATENT DOCUMENTS

WO WO-2016059451 A1 4/2016

OTHER PUBLICATIONS

Flury, Manuel, et al.; "Effectiveness of Distance-Decreasing Attacks Against Impulse Radio Ranging;" 3rd ACM Conference on Wireless Network Security, 2010; pp. 117-128.

Gill, Rupinder, et al.; "Specification-Based Intrusion Detection in WLANs;" Proceedings of the 22nd Annual Computer Security Applications Conference; Dec. 11-15, 2006; doi:10.1109/ACSAC.2006.48.

(Continued)

*Primary Examiner* — Qutbuddin Ghulamali
(74) *Attorney, Agent, or Firm* — Daniel D. Hill (57) ABSTRACT

A method is provided for detecting an attack on a keyless entry system for a vehicle. The method includes receiving a wireless transmission by the keyless entry system. The wireless transmission is filtered in a first filter to produce a filtered wireless transmission. The wireless transmission is filtered in a second filter to produce a reference filtered wireless transmission. A frequency band of the filtered wireless transmission is compared to a frequency band of the reference filtered wireless transmission. Based on the comparison, it is determined if the wireless transmission is from a key fob that complies with the specification of the wireless transmission. In another embodiment, a wireless receiver is provided for performing the method.

9 Claims, 5 Drawing Sheets

(56) References Cited

OTHER PUBLICATIONS

Jokar, Paria, et al.; "Specification-based Intrusion Detection for Home Area Networks in Smart Grids;" Cyber and Physical Security and Privacy (IEEE SmartGridComm) 2011; pp. 208-213.

Poturalski, Marcin, et al.; "Distance Bounding with IEEE 802.15.4a: Attacks and Countermeasures;" IEEE Transactions on Wireless Communications; Apr. 2011; vol. 10, Issue: 4; pp. 1334-1344.

Poturalski, Marcin, et al.; "The Cicada Attack: Degradation and Denial of Service in IR Ranging;" 2010 IEEE International Conference on Ultra-Wideband (ICUWB2010).

U.S. Appl. No. 15/611,014; Thomas Baier, et al.; "Processing Module for a Communication Device and Method Therefor;", filed Jun. 1, 2017.

Poturalski, Marcin et al.; "On Secure and Precise IR-UWB Ranging;" IEEE Transactions on Wireless Communications, pp. 1087-1099, vol. 11, No. 3, Mar. 2012; and Date of Publication Jan. 24, 2012; DOI: 10.1109/TWC.2012.011812.110483.

\* cited by examiner

WIRELESS RECEIVER AND METHOD FOR DETECTING AN ATTACK ON A KEYLESS ENTRY SYSTEM FOR A VEHICLE

BACKGROUND

Field

This disclosure relates generally to security, and more particularly, to a wireless receiver and method for detecting an attack on a keyless entry system for a vehicle.

Related Art

Various security sensitive systems, such as contactless payment, contactless car access, contactless door access, etc. depend on wireless communications that may be subjected to attacks. Secure wireless transmissions, such as radio frequency (RF) transmissions, are mainly secured by one or both of distance bounding and cryptographic challenge/response mechanisms. However, there are several ways to attack these mechanisms to gain access to the security sensitive systems. For example, in an automotive security system protected by distance bounding, one known attack is called a relay attack. A relay attack may be mounted by two attackers, one near the legitimate key fob and the other near the car. In a successful relay attack the security system of the car is deceived about the actual distance between the legitimate key fob and the car by a relay channel set up between the legitimate key fob, the two attackers, and the car.

Therefore, a need exists for a more secure method to protect security sensitive systems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a wireless system and a method for detecting attacks on the wireless system. In one embodiment, the wireless system is a keyless entry system for a vehicle. The method includes detecting a wireless transmission, for example, from a key fob to a receiver of the wireless system. A predetermined parameter of the wireless transmission is compared to a reference parameter. Based on the comparison, it is then determined if the wireless transmission is from a transmitter that complies with a specification of the wireless transmission. In one embodiment, the predetermined parameter may be a frequency bandwidth of the wireless transmission. In another embodiment, the predetermined parameter may be a transmit power of the wireless transmission. The reference parameter is a specification value of the frequency bandwidth or transmit power of a transmission protocol or standard of the wireless transmission. In another embodiment, the predetermined parameter may be another specification value of the transmission protocol that can be measured in a receiver of a wireless transmission.

The described method and receiver provides protection against relay attacks, while allowing out-of-frequency band content to be minimized.

In accordance with an embodiment, there is provided, a method for detecting an attack on a wireless system, the method including: detecting a wireless transmission; comparing a predetermined parameter of the wireless transmission to a reference parameter; and determining if the wireless transmission is from a transmitter that complies with a specification of the wireless transmission based on the comparison. The predetermined parameter of the wireless transmission may be a frequency bandwidth and the reference parameter is a frequency bandwidth specification value of a predetermined wireless transmission specification. The predetermined parameter of the wireless transmission may be a transmit power value and the reference parameter may be a predetermined transmit power specification value of a predetermined wireless transmission protocol specification. The method may further include measuring a signal strength of the wireless transmission to determine the transmit power value. Detecting the wireless transmission may further include: bandpass filtering the wireless transmission with a bandpass filter having a first predetermined passband; bandpass filtering the wireless transmission with a reference bandpass filter having a second predetermined passband; and filtering the bandpass filtered wireless transmission using a matched filter to produce a matched filter output; wherein comparing the predetermined parameter to the reference parameter further comprises comparing a signal strength of the matched filter output to a reference signal strength. The second predetermined passband may be larger than the first predetermined passband. The method may further include authenticating the wireless system if the wireless transmission is determined to comply with the specification. The predetermined parameter of the wireless transmission may be a transmit power value, and if the transmit power value of the wireless transmission is greater than a reference transmit power value, then the wireless transmission does not comply with the specification of the wireless transmission. The specification of the wireless transmission may be an ultra-wide band (UWB) specification for a keyless entry system for a vehicle. Receiving a plurality of pulses from the wireless transmission and averaging a signal strength of the plurality of pulses may be performed to determine if the transmission is within a transmit power specification value.

In another embodiment, there is provided, a method for detecting an attack on a keyless entry system for a vehicle, the method including: receiving a wireless transmission by the keyless entry system; filtering the wireless transmission in a first filter to produce a filtered wireless transmission; filtering the wireless transmission in a second filter to produce a reference filtered wireless transmission; comparing a frequency band of the filtered wireless transmission to a frequency band of the reference filtered wireless transmission; and determining if the wireless transmission is from a key fob that complies with the specification of the wireless transmission based on the comparison. The method may further include measuring a signal strength of the wireless transmission to determine the transmit power value. Filtering the wireless transmission in a first filter may further include: filtering a wireless transmission signal in a bandpass filter to produce a bandpass filtered wireless transmission signal; and filtering the bandpass filtered wireless transmission signal in a matched filter to produce the filtered wireless transmission signal. Filtering the wireless transmission in a second filter may further include: filtering a wireless transmission signal in a reference bandpass filter to produce a reference bandpass filtered wireless transmission signal; and filtering the reference bandpass filtered wireless transmission signal in a reference matched filter to produce the reference filtered wireless transmission signal. The method may further include authenticating the key fob if the wireless transmission is determined to comply with the specification.

In yet another embodiment, there is provided, a wireless receiver for a keyless entry system in a vehicle, the wireless receiver including: an amplifier having an input coupled to receive a wireless transmission from a key fob transceiver, and an output; a bandpass filter having an input coupled to the output of the amplifier, and an output; a matched filter having an input coupled to the output of the bandpass filter and an output; and a comparator having a first input coupled to the output of the matched filter, a second input coupled to receive a reference value, and an output for providing a result of a comparison of signal energies of the outputs of the matched filter and the reference matched filter. The wireless receiver may further include a signal strength monitor coupled to monitor a signal strength of the matched filter output. The wireless receiver may further include: a reference bandpass filter having an input coupled to the output of the amplifier, and an output; and a reference matched filter having an input coupled to the output of the bandpass filter, and output for providing the reference value. The comparator may determine if a bandwidth of the matched filter output matches a bandwidth of the reference value, and if the bandwidth of the matched filter output matches the bandwidth of the reference values, the wireless transmission complies with a wireless transmission protocol specification bandwidth. The wireless receiver may further include a first signal strength monitor coupled to receive the matched filter output and a second signal strength monitor coupled to receive the reference value, wherein a signal strength of the match filter output and a signal strength of the reference value are used to determine if the wireless transmission complies with the wireless transmission protocol.

Figure 1:
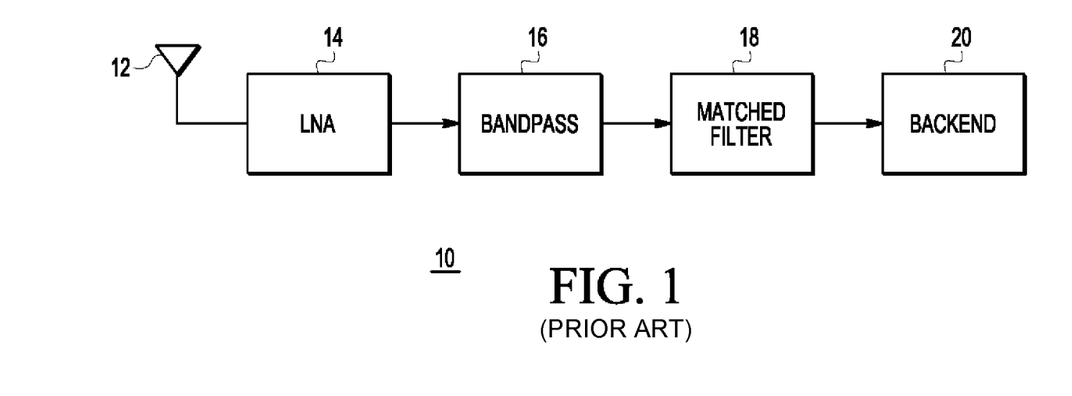
FIG. 1 illustrates a prior art wireless receiver.
Figure 6:
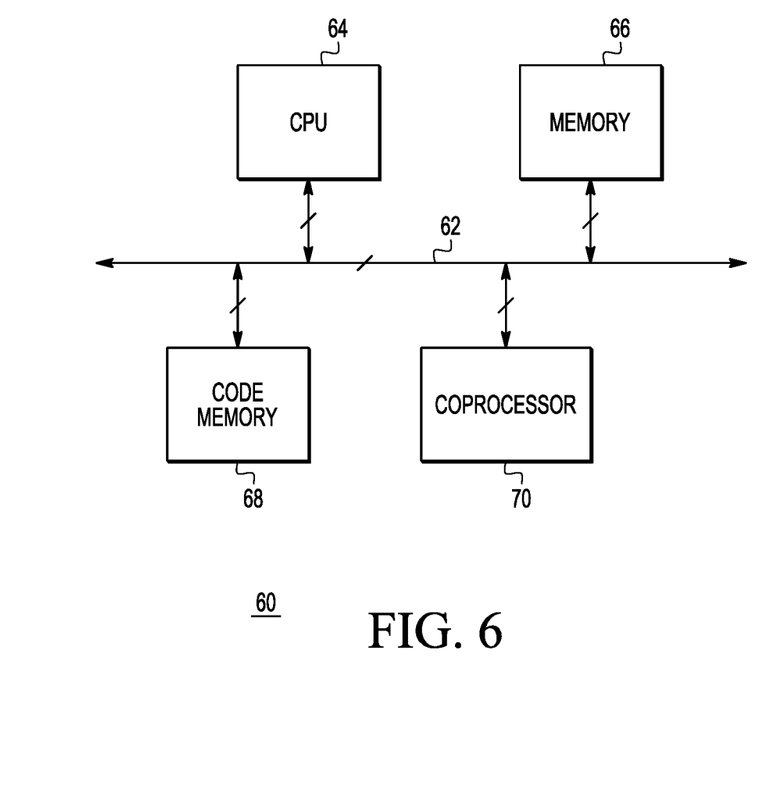
FIG. 6 illustrates a backend processing circuit of the wireless receiver of FIG. 3 in accordance with an embodiment.

FIG. 1 illustrates a prior art wireless receiver 10. Wireless receiver 10 includes low noise amplifier (LNA) 14, bandpass filter 16, matched filter 18, and backend 20. Amplifier 14 has an input connected to antenna 12, and an output. Amplifier 14 receives a wireless transmission from antenna 12. Bandpass filter 16 has an input connected to the output of LNA 14, and an output for providing a bandpass filtered signal. Matched filter 18 has an input connected to the output of bandpass filter 16, and an output for providing a matched filtered output signal. Backend 20 is connected to receive the matched filtered output signal from matched filter 18. Backend 20 may include signal processor, data processor, and related systems. An example processor for use in backend 20 is illustrated in FIG. 6 and will be described later. Receiver 10 may be an ultra-wide band (UWB) receiver. In receiver 10, a signal is received from antenna 12 and amplified in LNA 14. The relevant frequency band is filtered out by bandpass filter 16. A pulse shape of the signal used for distance bounding is known and hence may be passed through matched filter 18 to achieve a better signal-to-noise ratio (SNR). The output of matched filter 18 is provided to backend 20 for further processing.

Figure 2:
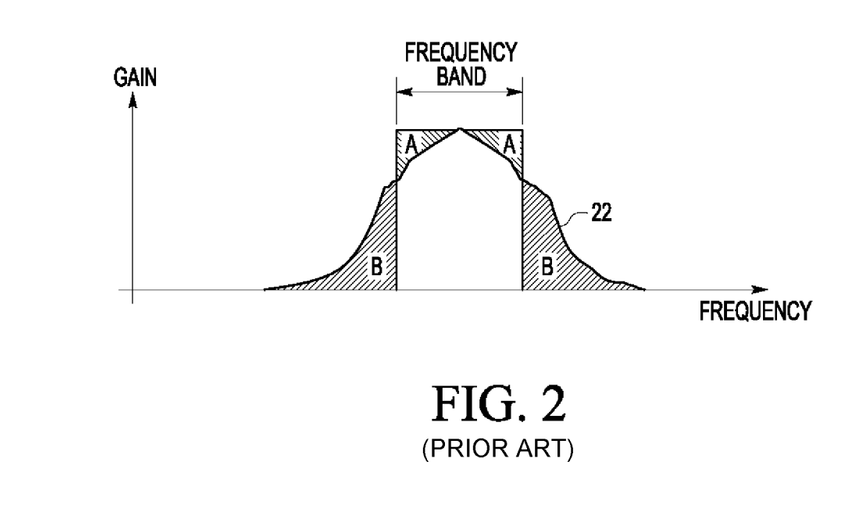
FIG. 2 illustrates a transfer characteristic of a bandpass filter of the wireless receiver of FIG. 1.

FIG. 2 illustrates a graph of a transfer characteristic 22 of bandpass filter 16 of wireless receiver 10 of FIG. 1. An allowed frequency band of bandpass filter 16 is illustrated in FIG. 2 and labeled "FREQUENCY BAND." Ideally, bandpass filter 16 should not attenuate signal frequencies inside the allowed frequency band, and completely block all other frequencies. The frequency blocking provided by bandpass filter 16 is important to reduce noise and other signals outside the allowed frequency band. An area labeled "A" in FIG. 2 shows unintended attenuation for the allowed signal frequencies, while an area labeled "B" shows the unintended passing thru of frequencies outside of the allowed frequency band. For a UWB bandpass filter, the frequencies would be at least in the upper Megahertz range. Bandpass filter 16 is an analog filter, so that the edges of the filter transfer characteristic cannot be made so steep that areas A and B are negligibly small. By changing the upper and lower cut-off frequencies of bandpass filter 16, area A can be reduced, but area B will become larger, which will cause more noise to be received and reduce the SNR, requiring more transmit power. However, increasing the transmit power may not be allowed if the maximum transmit power is being used. Conversely, if the area B is reduced, area A will become larger, which will lead to lost signal content, and reduce the accuracy of distance bounding. Hence, there is a trade-off between minimizing the unwanted areas A and B.

Because the accuracy of distance bounding is directly linked to the security against attacks, reducing area A in FIG. 2 is a primary goal, and therefore the increased area of area B has generally been accepted. However, increasing the area of area B will result in receiver 10 being more vulnerable to attacks from illegitimate devices.

Figure 3:
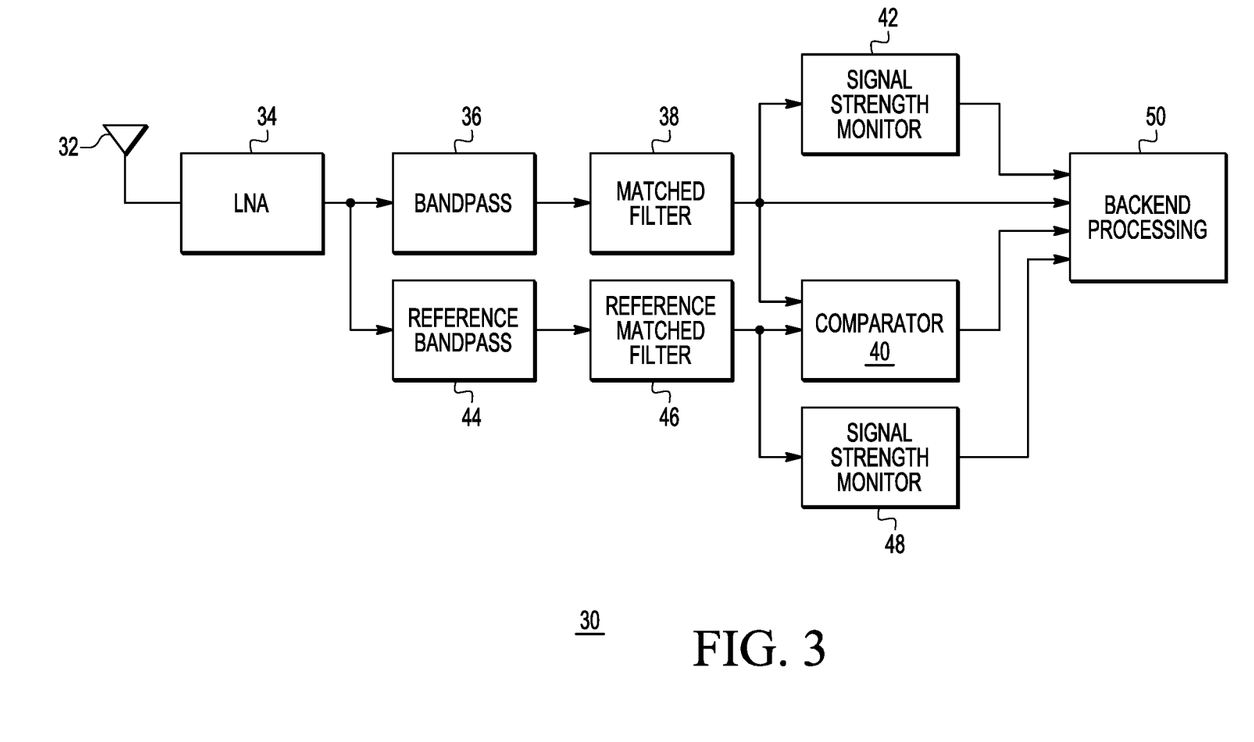
FIG. 3 illustrates a wireless receiver in accordance with an embodiment.

FIG. 3 illustrates wireless receiver 30 in accordance with an embodiment. Wireless receiver 30 includes LNA 34, bandpass filter 36, matched filter 38, comparator 40, signal strength monitor 42, reference bandpass filter 44, reference matched filter 46, signal strength monitor 48, and backend processing block 50. Low-noise amplifier 34 has an input connected to antenna 32 for receiving a wireless transmission, and an output. Bandpass filter 36 has an input connected to the output of LNA 34, and an output. Matched filter 38 has an input connected to the output of bandpass filter 36, and an output. Reference bandpass filter 44 has an input connected to the output of LNA 34, and an output. Reference matched filter 46 has an input connected to the output of reference bandpass filter 44, and an output. Comparator 40 has a first input connected to the output of matched filter 38, a second input connected to the output of reference matched filter 46, and an output. Signal strength monitor 42 has an input connected to the output of matched filter 38, and an output. Signal strength monitor 48 has an input connected to the output of reference matched filter 46, and an output. Backend processing block 50 has a first input connected to the output of signal strength monitor 42, a second input connected to the output of matched filter 38, a third input connected to the output of comparator 40, and a fourth input connected to the output of signal strength monitor 48.

Comparator 40 compares the signal energies at the outputs of matched filters 38 and 46. Because the frequencies outside of the allowed frequency band can also be in use by other radio frequency (RF) systems, it is required that measures be taken to prevent these other RF signals do not disturb the comparison of the signal energies. Therefore, the comparison only takes place during the time when a pulse is received by receiver 30. The time of the comparison is determined by when the pulse is processed by reference matched filter 46 because reference matched filter 46 has a higher bandwidth, and therefore outputs the pulse sooner than matched filter 38. If a result of the comparison by comparator 40 is that the energy at the output of matched filter 38 is substantially lower than the energy at the output of the reference matched filter 46, then a large amount of out-of-band energy has been received, indicating that the received signal comes from an illegitimate device, which is using a higher bandwidth in violation of the regulatory standard or protocol, to perform an attack. To reduce the influence of signal frequencies outside of the allowed band, a difference of signal energies can be compared instead of an absolute value of signal energies.

Transmit power is monitored using signal strength monitors 42 and 48 to detect violations of transmit power regulations, standards, or protocols. Monitoring transmit power addresses the case where an attacker uses higher transmit power than allowed, or uses a high-gain antenna to supersede the signal of the legitimate transmitter. In the case of the high-gain antenna, the parameter of a violated RF standard might not be transmit power, but of the field strength at a given distance. To make this determination, time-of-flight or triangulation of a plurality of receivers may be used, where each of the plurality of receivers measures a received signal level, calculates the transmitter's position, and thus its distance from the receivers. Alternately, a plurality of pulses from the wireless transmission may be received and a signal strength of the pulses may be averaged to determine if the transmission signal strength is within a transmit power specification value.

After it is determined that the wireless transmission complies with a specification protocol, the key fob may also be authenticated using a conventional authentication scheme to ensure that the key fob is legitimate. One way to authenticate is via challenge/response messages. The challenge/response communication may be any type of conventional challenge/response, such as a communication that uses a secret key and a cryptographic algorithm. For example, in one embodiment, the authentication process involves a common secret between the key fob and the vehicle. The vehicle will first transmit a challenge word to the key fob. Note that the challenge/response communication between the vehicle and the key fob requires the vehicle to also include a transmitter, which is not illustrated in FIG. 2. The key fob calculates a response word based on the challenge word and on the common secret. The response word is transmitted to the vehicle. The vehicle knows from processing the response word if the key fob is in possession of the correct common secret. If the response word from the key fob is correct, the vehicle provides access. If the response word is incorrect, the vehicle does not provide access. In another embodiment, another method for authentication may be used.

Comparing the signal energies from the matched filter 38 and reference matched filter 46 provides the benefit of improving security by allowing a more informed compromise between the amount of out-of-band signal energy as discussed above regarding FIG. 2. Furthermore, the described embodiment allows a better choice of bandpass bandwidth so that a distance bounding function is improved.

Figure 4:
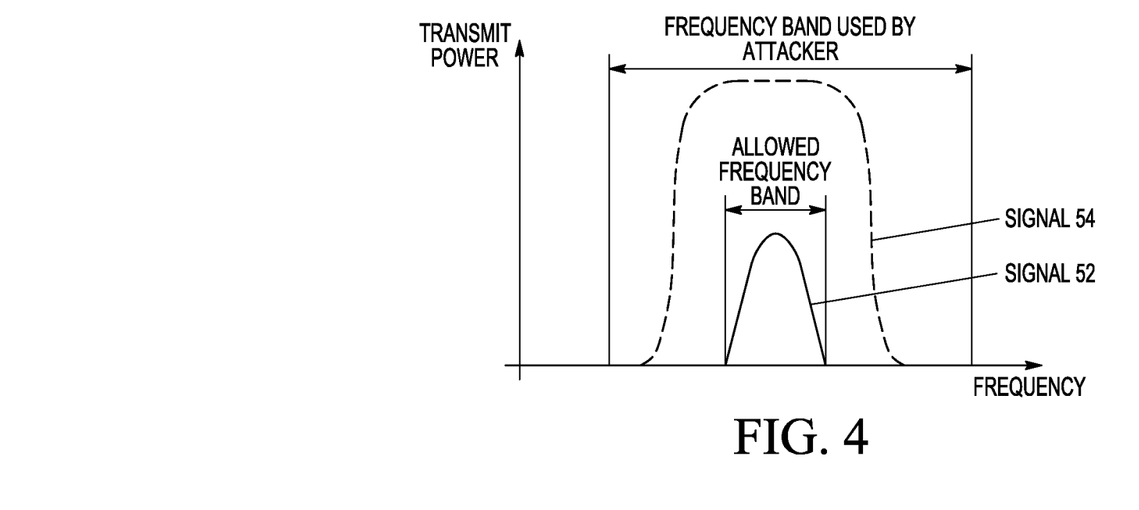
FIG. 4 illustrates a signal characteristic comparison of legitimate and illegitimate passbands in the frequency domain.

FIG. 4 illustrates a signal characteristic comparison of a legitimate and illegitimate passband in the frequency domain. Signal 52 is from a legitimate transmitter and is shown within an allowed frequency band. Signal 54 is from an illegitimate transmitter and uses a much larger frequency band than legitimate signal 52. Also, signal 54 is transmitted with a much higher transmit power than signal 52, which can be detected using signal strength monitors 42 and 48 in FIG. 3.

Figure 5:
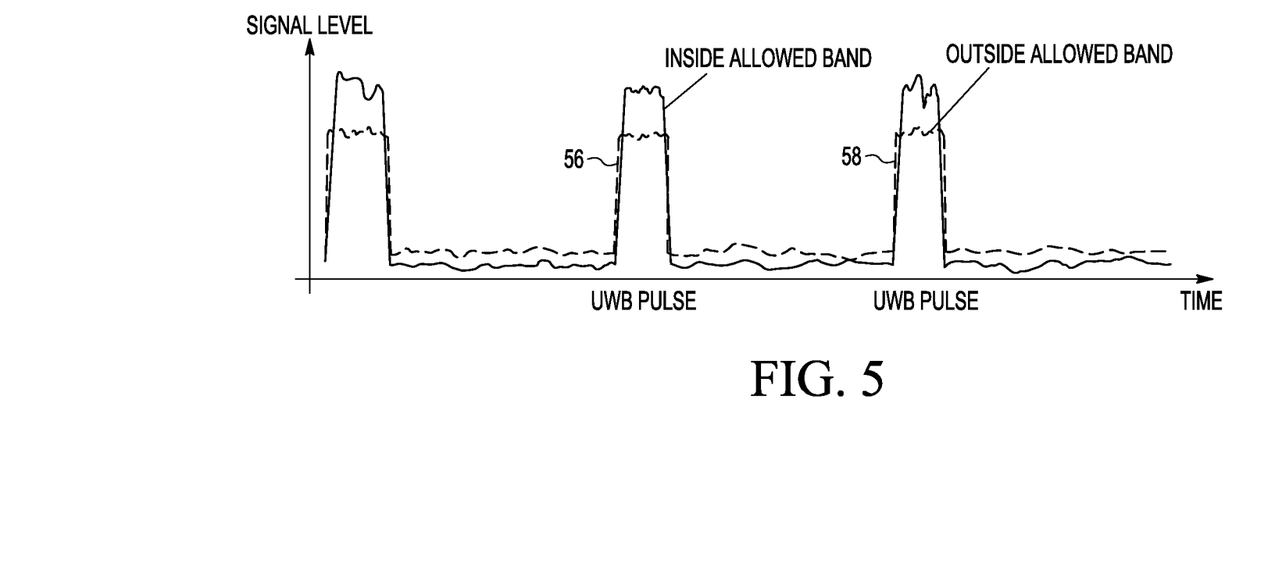
FIG. 5 illustrates a signal characteristic comparison of a legitimate and illegitimate key fob pulse in the time domain.

FIG. 5 illustrates a signal characteristic comparison of a legitimate and illegitimate key fob pulse in the time domain. Two pulses are illustrated in FIG. 5. Pulse 56 illustrates a UWB pulse that is within an allowed frequency band. Pulse 58 illustrates a UWB pulse that is outside of the allowed frequency band. As can be seen in FIG. 5, the difference between a legitimate pulse and an illegitimate pulse may be difficult to detect and result in false alerts. To improve detection accuracy, a plurality of pulses from the wireless transmission may be received and a signal strength of the pulses may be averaged to determine if the transmission signal strength is within a transmit power specification value.

The above described method to detect an illegitimate, or unauthorized key fob performs the detection using one or both of frequency bandwidth or signal strength. In other embodiments, another predetermined parameter of a wireless transmission may be used.

FIG. 6 illustrates a simplified view of backend processing circuit 60 of the wireless receiver of FIG. 3. Backend processing circuit 60 includes data and address bus 62. Each of central processing unit (CPU) 64, data memory 66, code memory 68, and coprocessor 70 are bi-directionally connected to bus 62. Backend processor 60 may be implemented on one or more integrated circuits. CPU 64 may be any hardware device capable of executing instructions stored in code memory 68. CPU 64 may be, for example, a microprocessor, field programmable gate array (FPGA), application-specific integrated circuit (ASIC), or similar device.

Data memory 66 may be any kind of memory, such as for example, L1, L2, or L3 cache or system memory. Data memory 66 may include volatile memory such as static random-access memory (SRAM) or dynamic RAM (DRAM), or may include non-volatile memory such as flash memory, read only memory (ROM), or other volatile or non-volatile memory.

Code memory 68 may include one or more machine-readable storage media for storing instructions for execution by CPU 64. In other embodiments, memory 66 may also store data upon which CPU 64 may operate. Code memory 68 may store, for example, a machine learning model, or encryption, decryption, or verification applications. A software implementation of a rake receiver may be implemented in code memory 68. Code memory 68 may be implemented in a secure hardware element and be tamper-resistant.

CPU 64 and coprocessor 70 may each be one or more of any kind of processor or processor core, such as for example, a microcontroller, microprocessor, digital signal processor, or the like, for executing instructions or commands.

Figure 7:
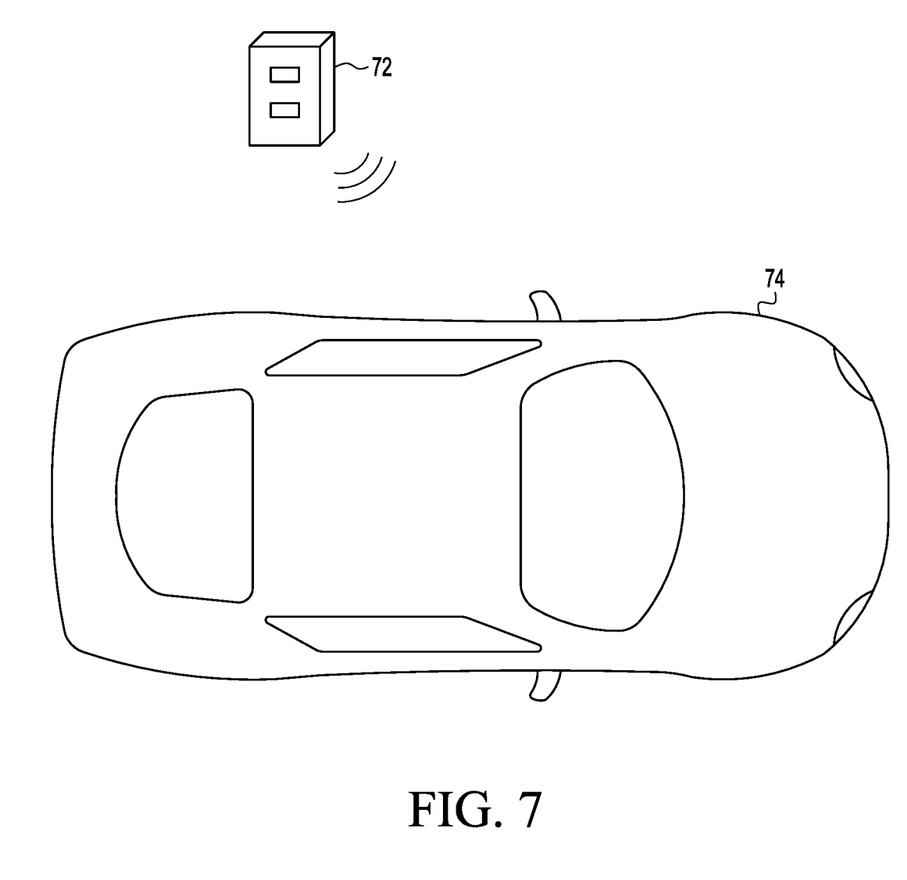
FIG. 7 illustrates a vehicle and a key fob transceiver.

FIG. 7 illustrates vehicle 74 and key fob transceiver 72. An automotive keyless entry system for vehicle 74 also includes key fob 72. Key fob 72 is a conventional key fob transceiver for communicating with the automobile keyless entry system for vehicle access. In one embodiment, vehicle 74 includes a keyless entry system that is based on a UWB protocol or standard for keyless entry systems. Vehicle 74 may be any kind of vehicle that can benefit from a keyless security system. Vehicle 74 may also be referred to as a car, automobile, truck, bus, or other type of vehicle that can benefit from the above described embodiments to detect if the key fob is legitimate or illegitimate.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting an attack on a wireless system, the method comprising:
   receiving a wireless transmission;
   bandpass filtering the wireless transmission with a bandpass filter having a first predetermined passband;
   bandpass filtering the wireless transmission with a reference bandpass filter having a second predetermined passband;
   filtering the bandpass filtered wireless transmission using a matched filter to produce a matched filter output;
   filtering the reference bandpass filtered wireless transmission with a reference matched filter to produce a reference matched filter output;
   comparing a signal strength of the matched filter output to a signal strength of the reference matched filter output; and
   determining if the received wireless transmission is from a transmitter that complies with a specification of the wireless transmission based on the comparison.

2. The method of claim 1, further comprising comparing a frequency bandwidth to a frequency bandwidth specification value of a predetermined wireless transmission specification.

3. The method of claim 1, further comprising comparing a transmit power value to a predetermined transmit power specification value of a predetermined wireless transmission protocol specification.

4. The method of claim 3, further comprising measuring the signal strength of the wireless transmission to determine the transmit power value.

5. The method of claim 3, wherein if the transmit power value of the wireless transmission is greater than a reference transmit power value, then the wireless transmission does not comply with the specification of the wireless transmission.

6. The method of claim 1, wherein the second predetermined passband is larger than the first predetermined passband.

7. The method of claim 1, further comprising authenticating the wireless system if the wireless transmission is determined to comply with the specification.

8. The method of claim 1, wherein the specification of the wireless transmission is an ultra-wide band (UWB) specification for a keyless entry system for a vehicle.

9. The method of claim 1, further comprising receiving a plurality of pulses from the wireless transmission and averaging a signal strength of the plurality of pulses to determine if the transmission is within a transmit power specification value.

* * * * *